Jan. 16, 1923.
J. W. JOHNSON.
DEVICE FOR INDICATING THE THERMAL VALUE OF GAS
FILED JAN. 24, 1922.
1,442,574
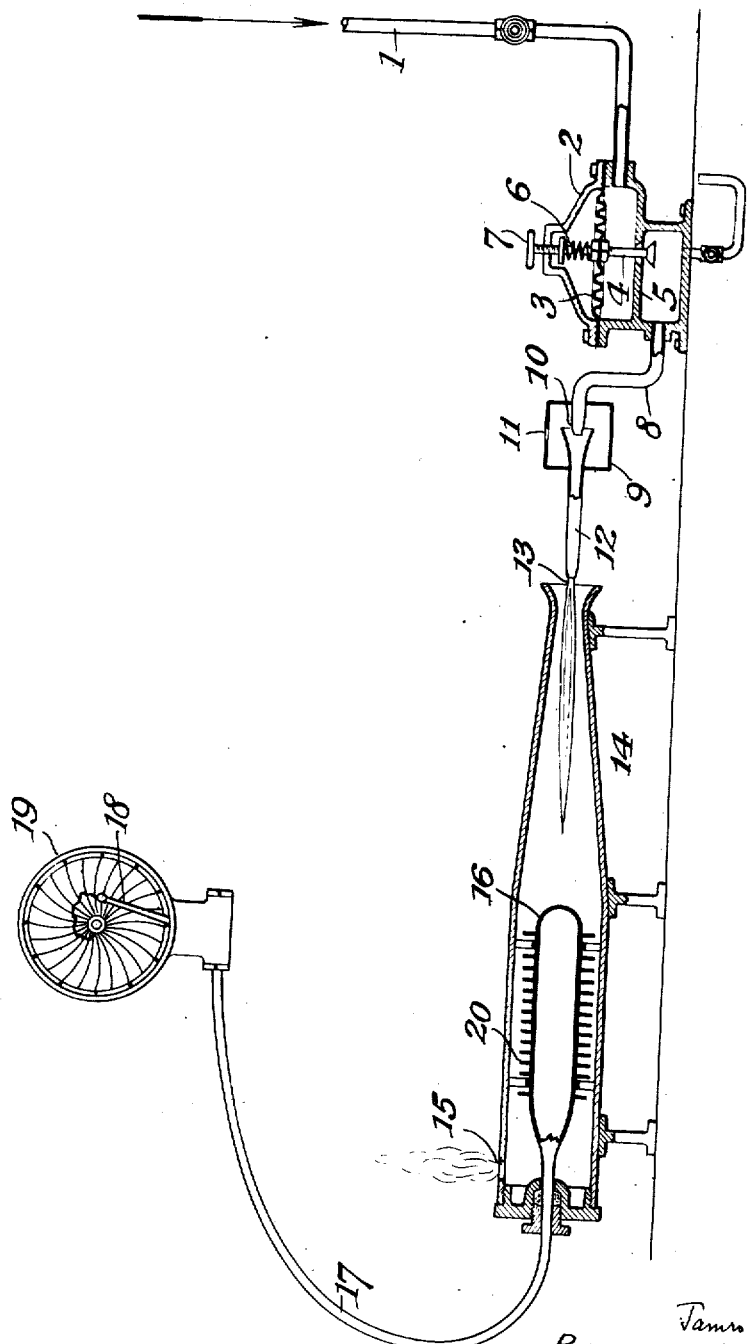
Inventor
James W. Johnson
By Parker W. Page,
Attorney Patented Jan. 16, 1923.

1,442,574

UNITED STATES PATENT OFFICE.

JAMES W. JOHNSON, OF NEW YORK, N. Y.

DEVICE FOR INDICATING THE THERMAL VALUE OF GAS.

Application filed January 24, 1922. Serial No. 531,501.

*To all whom it may concern:*

Be it known that I, JAMES W. JOHNSON, a citizen of the United States of America, residing at New York, in the county and State of New York (post-office address 115 Broad Street, New York, N. Y.), have invented certain new and useful Improvements in Devices for Indicating the Thermal Value of Gas, of which the following is a full, clear, and exact description.

In many industrial arts it frequently becomes necessary or desirable to indicate or ascertain the thermal value of the gas which is used as a source of heat. This is particularly true in the use of gas producers, the function of which is to generate a fuel gas, for to know at all times whether the operative conditions are being correctly carried on, the heating value of the gas produced should be accurately indicated. A gas of low order of heat units, for example, shows that the fire needs raking, the fuel replenishing, or the like. Various means for determining the thermal value of fuel gases are commonly used, but my object in developing this invention has been to produce a simple and efficient device capable of continued use which will indicate the thermal value of a gas preferably in B T units, and which may be used for general testing purposes or in connection with a gas producer whose action or effect it is necessary to observe and control.

My improved device is illustrated in the accompanying drawing, which is partly diagrammatic to show, not only the construction of the devices employed, but their method of use and operation.

A pipe 1 leads from a source of the gas, the thermal value of which it is desired to ascertain or indicate. This gas may be stored in any suitable form of reservoir or tank, and its pressure, for purposes of this case, is assumed to be variable. This pipe leads to a gas pressure regulator which may be of any proper construction and design. That shown comprises a casing 2, divided by a flexible diaphragm 3, which carries a valve 4 having a conical portion which fits a correspondingly shaped seat in a rigid partition 5. A spiral spring 6, which is attached to the valve stem or diaphragm and to a screw 7, is used to regulate the action of the diaphragm so that, irrespective of the pressure of the gas entering by pipe 1, that which passes out by pipe 8 will be always of uniform pressure.

The pipe 8 delivers the gas into a casing 9 through a contracted nozzle 10. The casing 9 has an opening 11, and in its side is fixed a Venturi tube 12 into which the gas issuing from the nozzle 10 is forced. The rush of gas draws through the tube 12 a fixed proportion of air which enters the hole 11, and by this device, commonly known as an aspirator, a uniform mixture of the gas and air is formed which issues at the contracted nozzle 13, where it is ignited and burned.

The proportion of gas and air at this point should be approximately such as to effect the complete combustion of the gas, but even if this be not the case the flaming jet, entering a second Venturi tube and chamber 14, which also forms an aspirator and draws in a fixed quantity of pure air into the chamber which completes this combustion and escapes through a vent 15, at the rear end of the chamber.

The air and gases in the chamber 14 will manifestly have at all times a temperature which corresponds to the thermal value of the gas entering by way of the pipe 1, and to indicate this temperature or the heat units corresponding thereto I place in the chamber formed by the enlarged end of the tube 14 a thermostatic or thermometric device, preferably containing a metal container 16 connected by a tube 17 with a registering device 19, the pointer 18 of which indicates on a proper dial the B. T. units of heat.

The container is preferably provided with flanges or fins 20 to increase its sensitiveness, and is filled generally with nitrogen or other expansible agent. The specific construction of this device and the means for indicating or registering the heat units is not of the essence of my invention, and any one of the many devices known to the art may be used for this purpose.

By means of the apparatus described I may draw on a source of gas at variable pressure for a given flow of gas at constantly uniform pressure, which is mixed with a fixed proportion of air and burned. This flame draws into the interior of the chamber 14 a fixed proportion of air which is uniformly mixed with the gases present and which correspond in temperature to the thermal value of the gas from the source. The instrument is thus efficient, simple, accurate and inexpensive, and affords a most useful and desirable adjunct to such apparatus a gas producer to indicate its operation and effect.

What I claim is:

1. A heat unit indicator for fuel gas, comprising, in combination with a source of gas which may have variable pressure, of means for drawing off and delivering a certain proportion of such gas at a constant and uniform pressure, an aspirator for mixing said gas with air, a burner to which said mixture is passed and by which it is burned as a jet, a second aspirator of which the burning jet forms a part, and means for indicating the temperature or heat units corresponding thereto of the air and gases delivered by said aspirator.

2. A heat unit indicator for fuel gas, comprising, in combination, a source of gas under variable pressure, means for imparting to a given proportion of such gas a constant and uniform pressure, means for mixing the same with a definite proportion of air and burning it, a chamber, means for introducing the gases of combustion of the flame with a fixed proportion of air into said chamber, and means for indicating the temperature of such mixture or the heat units corresponding thereto.

3. The combination with a source of gas subject to variations in pressure, of a gas pressure regulator, an aspirator comprising a jet or nozzle and a Venturi tube for mixing with the said gas a fixed proportion of air, a second Venturi tube, a burner which forces the flaming gas into said tube by which the gases of combustion are mixed with a fixed proportion of air, and a thermometric device in said tube for indicating the temperature of such mixture or the heat units corresponding thereto.

4. The combination with a source of gas subject to variations in pressure, of a gas pressure regulator for receiving and delivering a given proportion of such gas, means for mixing said gas with a fixed proportion of air and burning it, a chamber, means for mixing the products of the combustion of such flame with a fixed proportion of air in said chamber, and a thermometric device in said chamber comprising a metal container with fins or flanges to increase its sensitiveness to changes of temperature.

Is testimony whereof I hereto affix my signature.

JAMES W. JOHNSON.